INVENTOR.
ERNEST A. OVERSTEDT
BY *J. O. Hicks*
HIS ATTORNEY

Oct. 17, 1944.  E. A. OVERSTEDT  2,360,576
RELIEVING MACHINE
Filed Nov. 30, 1942  6 Sheets-Sheet 6

INVENTOR.
ERNEST A. OVERSTEDT
BY
HIS ATTORNEY

Patented Oct. 17, 1944

2,360,576

UNITED STATES PATENT OFFICE 2,360,576

RELIEVING MACHINE

Ernest A. Overstedt, Detroit, Mich., assignor to U. S. Tool & Mfg. Co., Dearborn, Mich., a corporation of Michigan Application November 30, 1942, Serial No. 467,311

3 Claims. (Cl. 82—28)

My invention pertains to machines or lathes for relieving the cutting teeth or blades of various kinds of toothed rotary cutters and more particularly to relieving machines of the kind wherein a relieving tool is moved radially in suitable timed relation to the rotation of the toothed cutter, carried by the work spindle, for relieving the back surfaces of the teeth of the cutter.

It is an object of my invention to provide an improved relieving machine wherein the relieving tool is retracted with a minimum amount of vibration and shock to the machine in time to start a relieving cut on the next advancing tooth on a toothed cutter which may be turned with a relatively high speed of rotation.

It is also an object of my invention to provide an improved relieving machine comprising a worm wheel and a constantly rotating worm for rotating the toothed cutter to be relieved, means journalling the worm for axial shifting and a pair of cams rotated at constant and equal speeds for feeding and retracting a tool rest carrying a relieving tool and for axially reciprocating the worm to introduce a pause in the rotation of the toothed cutter simultaneously with the retraction of the tool.

It is a further object of my invention to provide a relieving machine having improved means for coordinating the movements of the tool radially with the rotative movements of the toothed cutter so that the relieving tool may be smoothly retracted in time to start the cut on the advancing tooth of the cutter with a minimum of vibration and shock.

Another object of my invention is to provide such a relieving machine with an improved arrangement for rotatively supporting the spindle driving worm so that the worm while rotating may be automatically shifted axially at intervals by an actuating mechanism for modifying the rotary movement of a worm wheel driven by the worm.

A further object of my invention is to provide a cutter relieving machine embodying improved arrangements of positioning, coordinating and driving means.

Further objects and advantages are within the scope of my invention such as relate to the arrangement, operation and function of the related elements, to various details of construction and to combination of parts, elements per se, and to economies of manufacture and to numerous other features as will be apparent from a consideration of the specification in conjunction with the drawings disclosing a form of my invention, in which:

Figs. 6A, 6B and 6C are enlarged detail views thereof;

Figure 7:
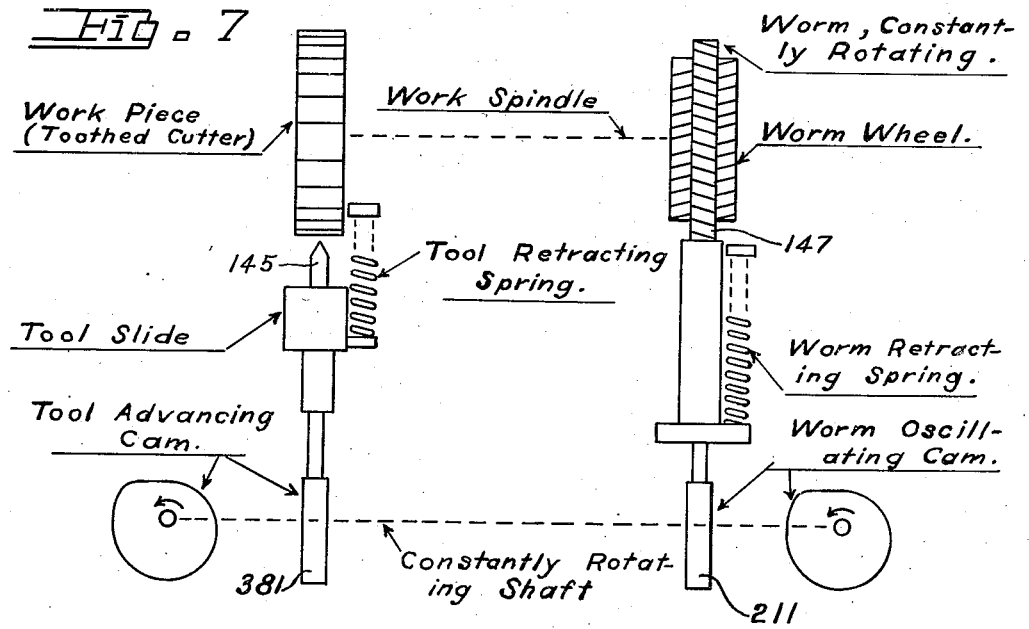
Figure 8:
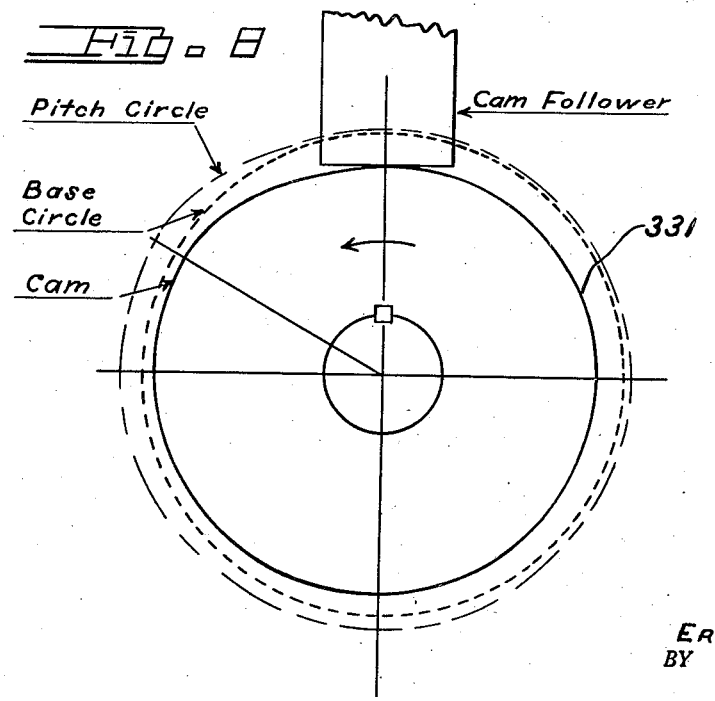

Fig. 7 is a diagrammatic view representing the driving mechanism for rotating the work spindle and reciprocating the tool rest for more clearly showing the coordinated control provided therebetween; and Fig. 8 is a side elevational view showing the shape of the smoothly operating cam which it is possible to utilize in the improved relieving machine embodying this improved coordinated control arrangement.

Figure 1:
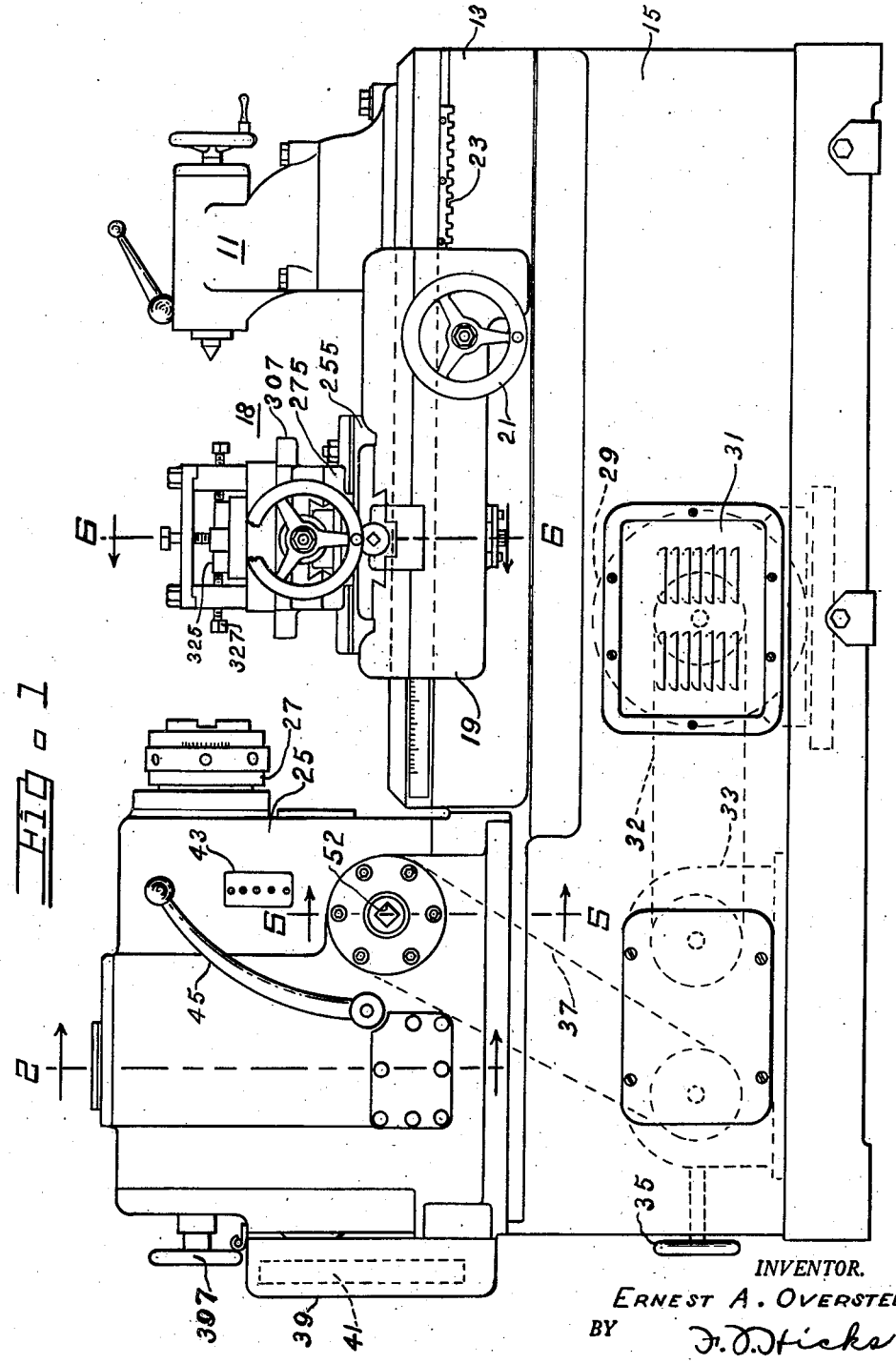
Fig. 1 is a front elevational view showing an improved relieving machine embodying the present invention.

Referring more specifically to Fig. 1 of the drawings, my improved relieving machine comprises a tailstock 11 resting in longitudinally adjustable relation upon the guide ways of the machine bed 13 mounted upon a pedestal structure 15, which is preferably an enclosing housing for various parts of the machine. Also resting adjustably upon the guide ways is the saddle of a compound tool rest 18 having a depending apron 19 and a manual traverse drive wheel 21 for rotating a gear (not shown) in mesh with rack teeth 23 for adjusting the tool rest to any desired position on the guide ways in the manner usual with relieving machines, lathes and the like. The tool rest 18 embodies special mechanism for reciprocating a relieving tool in a predetermined phase relation to the angular positions of the rotating work spindle, to be later described. The head stock 25 is mounted upon the other end of the machine bed supporting a work carrying spindle 27 in alignment with the center of the tailstock 11 in a usual arrangement and it comprises a special mechanism providing a modified rotation of the work spindle, to be subsequently described in detail. Mounted in and enclosed by the pedestal housing 15 is an electric motor 29 (shown dotted) to which cooling and ventilating air may circulate through a louvre plate 31 secured over an opening in the front of the housing. From the motor 29 V-belts 32 extend (represented by dotted lines) to a variable speed drive unit 33 of a well known type, which may be conveniently adjusted by an external hand wheel 35 to provide a smooth variation of speed to select any constant driving speed desired over a wide range. From the drive unit 33, belts 37 (shown dotted) extend upwardly along the back of the machine for driving the work spindle 27. On the left hand end of the headstock a gear guard 39 is hinged for enclosing gears 41 (shown dotted) whereby the tool reciprocating mechanism and the rotating work spindle, may be driven simultaneously in a conveniently adjustable speed ratio by changing the gears, in a well known manner. On the front of the headstock are conveniently mounted push button switches 43 for controlling the electric motor in a usual manner, and a clutch throw out lever 45 for conveniently connecting or disconnecting the driving means for adjusting or in case of emergency.

Figure 2:
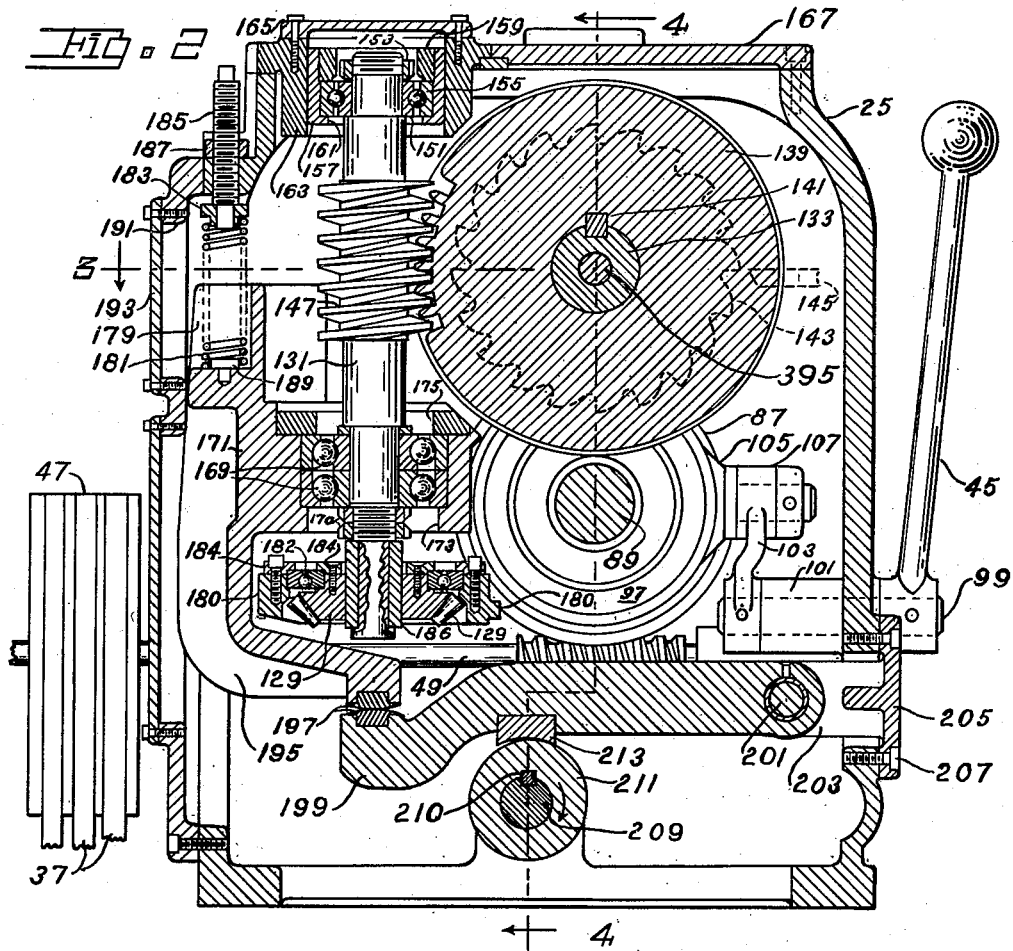
Fig. 2 is an enlarged cross sectional view of the headstock taken on line 2—2 of Fig. 1, and partially broken away, showing the work spindle driving mechanism.
Figure 4:
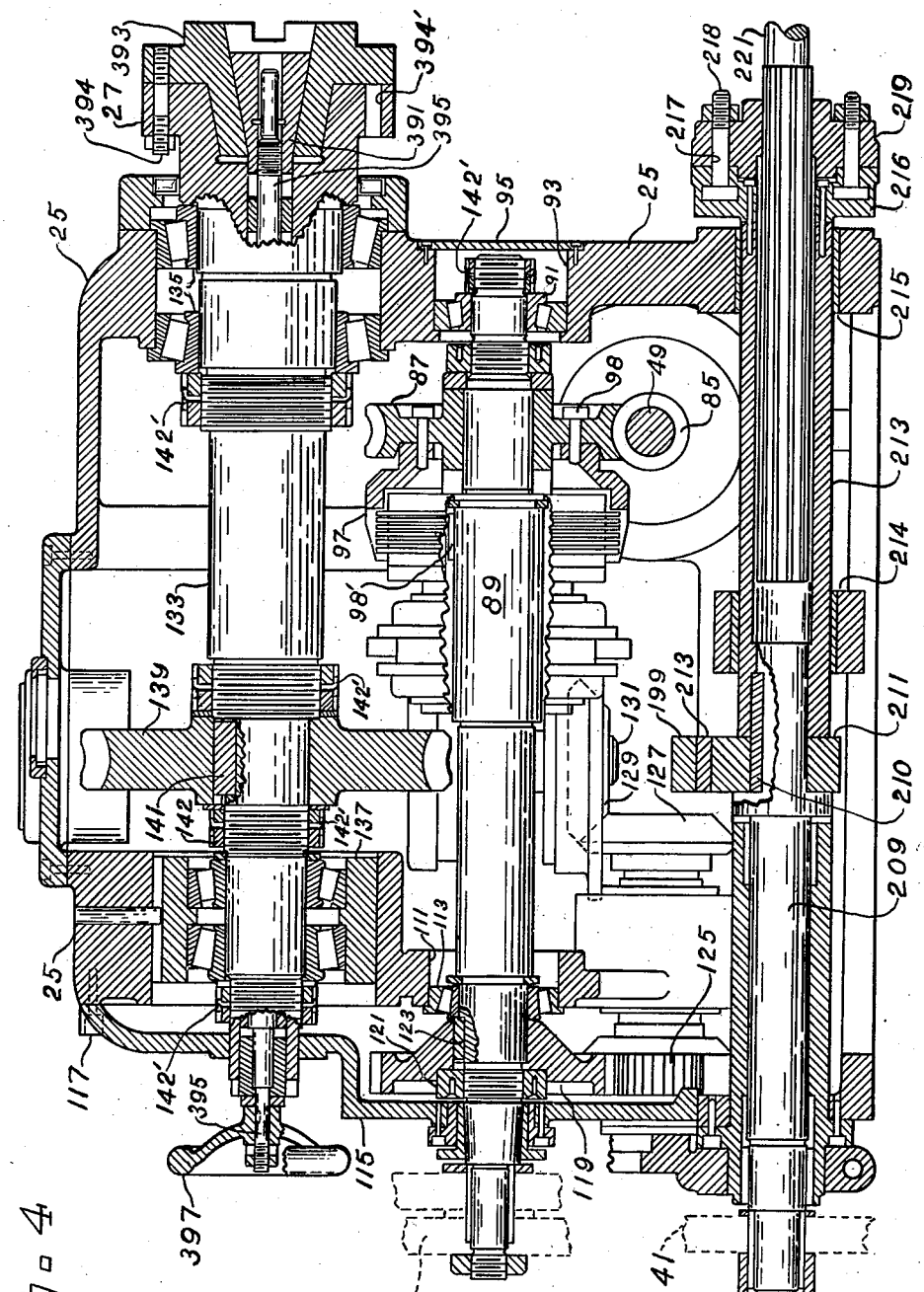
Fig. 4 is a longitudinal sectional view through the headstock on line 4—4 in Fig. 2.
Figure 5:
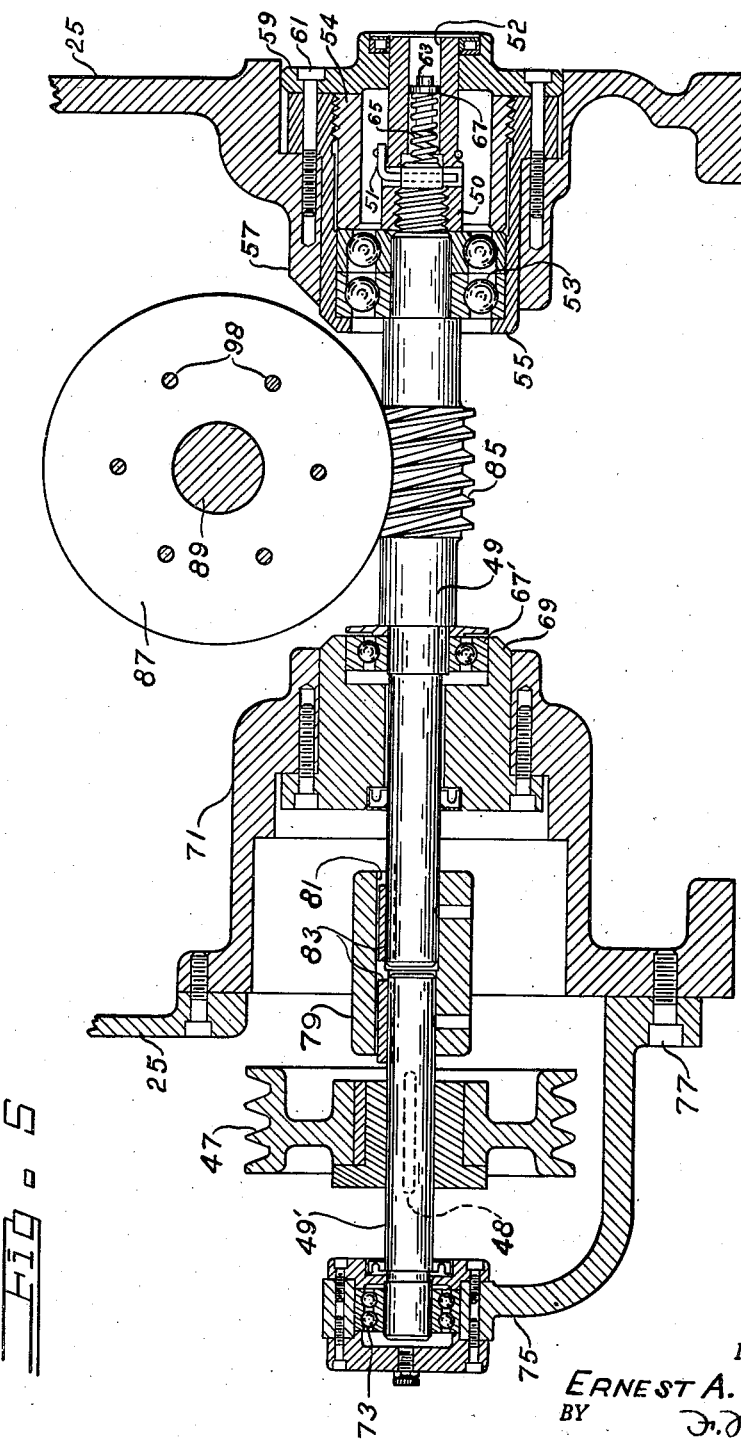
Fig. 5 is a side elevational view showing a sub-assembly of the driving shaft and associated parts in the head stock.

As shown in Figs. 2 and 4, the machine is smoothly driven through a plurality of the V-belts 37 running up along the back of the headstock over a pulley 47 secured on the outer end of a shaft 49 which is journalled in suitable bearings in the back and front walls of the headstock housing. The front end of the driving shaft 49 is provided with a tubular extension 50 threadably secured thereon, locked by a pin 51 passing transversely therethrough, and presenting a square aperture 52 opening to the front for convenient manual adjustment by inserting a wrench or crank from the front of the machine, as may be seen in Figs. 1 and 5. The front end of the driving shaft 49 is journalled in ball bearings 53 mounted by sleeve 54 in a bearing ring 55 secured in an inwardly directed boss 57 by a circular bearing plate 59 and screws 61. The aperture 52 has a crank ejector 63 slidably disposed therein. A spring 65 is disposed in the shaft extension 50 for reacting between the front end of the shaft and an annular flange 67 on the ejector 63 to continuously bias the ejector to move out for disengaging any crank, tool or wrench except when it is pressed firmly thereinto when in actual use.

The other end of the driving shaft 49 is journalled in a ball bearing 67' secured in a bearing ring 69 mounted in a boss 71 projecting inwardly from the rear wall of the headstock housing. A rear end portion 49' of the shaft, which actually carries the belt pulley 47, secured thereon by a key 48, is preferably journalled in an end bearing 73 in a bracket 75 secured to the rear wall by screws 77 and projecting rearwardly therefrom. The two portions of the driving shaft are operatively connected together through any suitable driving connector. The driving connector may comprise a tubular member 79 overlapping the adjacent ends of the two portions of the shaft and having a groove or key-way 81 extending axially in the inner surface for receiving keys 83 which are secured in grooves in the shafts, to permit a limited freedom of movement therebetween. The driving shaft 49 carries and drives a worm 85 which meshes with and drives a worm wheel 87. The worm wheel 87 is mounted to rotate freely upon a counter-shaft 89 one end of which is journalled in a roller bearing 91 (as shown in Fig. 4) mounted in a bearing aperture 93 in a side-wall of the headstock housing 25 to which convenient access is provided by a removable plate 95. The counter-shaft 89 is driven from the worm wheel 87 through an operatively interconnecting clutch 97 of any suitable conventional construction, a multiple disc clutch being represented. One side of the clutch is secured by bolts 98 to one side of the worm wheel, and the other side to the shaft by a key 98'.

The clutch 97 is controlled by a clutch lever 45 mounted conveniently on the front of the machine, shown in Figs. 1 and 2. The clutch control lever is secured on the outer end of a shaft 99 journalled in a bearing boss 101 in the headstock housing 25 and has an inner clutch lever 103 secured on the inner end. The inner clutch lever 103 is provided with a fork 105 mounted on a pivot bearing 107 on its swinging end and is thereby connected with the clutch bar for throwing the clutch into power transmitting engagement to drive the counter-shaft 89, or to a disconnected position, in a well known manner. The left-hand portion of the counter-shaft 89 passes through an aperture 111 in the end wall of the headstock housing, wherein it is journalled in a roller bearing 113, the end of the shaft projecting outwardly through an aperture in an end cover plate 115 secured to the headstock housing, as by screws 117. On the portion of the counter-shaft 89 between the headstock housing and the end cover plate, a spur gear 119 is secured by a nut 121 and a key 123. The gear 119 meshes with an adjacent spur gear 125 for driving a bevel gear 127 which in turn drives a bevel gear 129 secured on the lower end of a vertically journalled shaft 131, to be subsequently described. The outer projecting end of the countershaft 89 is provided with conveniently changeable gears 41 (shown dotted) whereby the ratio for reciprocating the relieving tool may be conveniently changed and selected, as previously explained. Figs. 2 and 4 also show the work spindle shaft 133 which extends horizontally in the headstock housing 25, where it is journalled in suitable bearings 135 and 137 in the housing and carries a worm wheel 139 secured thereon, as by a key 141, and pairs of nuts 142 locked by a lock washer 142' in a conventional manner. The teeth of worm wheel 139 are mostly represented diagrammatically by a solid circle. In Fig. 2, the outline of a toothed cutter 143 and a relieving tool 145 are represented in dotted lines.

As shown in Fig. 2, meshing operatively with the work spindle worm wheel 139 is a driving worm 147 carried on shaft 131. The ends of the shaft 131 of the driving worm are journalled for rotation and also for axial shifting. For this purpose, the upper end of the worm shaft 131 is of a reduced diameter and receives the inner race 151 of a ball bearing secured thereon by a nut 153 on the upper end of the shaft, which is suitably threaded. The inner end of the inner race ring 151 is secured snugly against the shoulder provided by the larger portion of the shaft. The outer race ring 155 of the bearing is secured into a sliding bearing cup 157 by a race retainer ring 159, which may be threadedly secured or pressed therein and at the other end the bearing cup 157 is provided with an inturned flange 161 against which the lower end of the race ring is firmly abutted by the pressure of the retainer ring.

As Fig. 2 shows, the bearing cup 157 is slidably disposed in a stationary bearing 163 which is a part of a plate in the upper wall of the headstock housing and which extends axially a substantial distance into the housing to provide for axial shifting movement of the bearing cup and the ball bearing with the upper end of the worm shaft 141. The upper end of the stationary bearing 163 is closed by a removable cover 165 secured thereon, as by screws. An adjacently disposed opening of larger diameter in the upper wall is closed by a cover plate 167 secured thereon by screws.

The lower end of the worm shaft 131 is of reduced diameter for receiving the inner races of two radial thrust ball bearings 169 which are positioned in opposed relation for sustaining end thrust in either axial direction along the worm shaft, and secured by nuts 170, as may be seen in Fig. 2. The outer race rings of the ball bearings are secured into a suitable aperture in a sliding bracket or slide 171 having an inturned flange 173 in the lower end and a retainer ring 175 secured in the upper end as by screws 177, shown in Fig. 3. The upper end of the sliding bracket 171 is provided with a slot 179 opening upwardly and toward the front for receiving the lower end of a compression spring 181, the upper end of which reacts against a spring stop 183 supported adjustably on the lower end of a spring stop screw 185 passing threadably through an offset portion of the upper wall of the headstock housing. The upper end of the spring screw 185 is made of some non-circular shape for receiving a wrench, and a lock nut 187 which is turned into snug engagement on the housing, locks the compression screw and the spring tension in any adjusted position. A retainer stop 189 is provided for holding the lower end of the spring on the lug. The spring 181 is conveniently accessible through an opening 191 provided in the side of the housing and closed by a cover plate 193. An actuating arm 195 comprising a back wall with the side flanges extends downwardly from the bearing support and the lower end thereof is bent back under the bearing support in an L shaped relation. The lower end of the slide bracket actuating arm 195 is provided with a downwardly projected contacting plug 197 having a hardened convex surface resting on a similar hardened contact plug presented upwardly from one end of a movable worm oscillating member 199.

Figure 3:
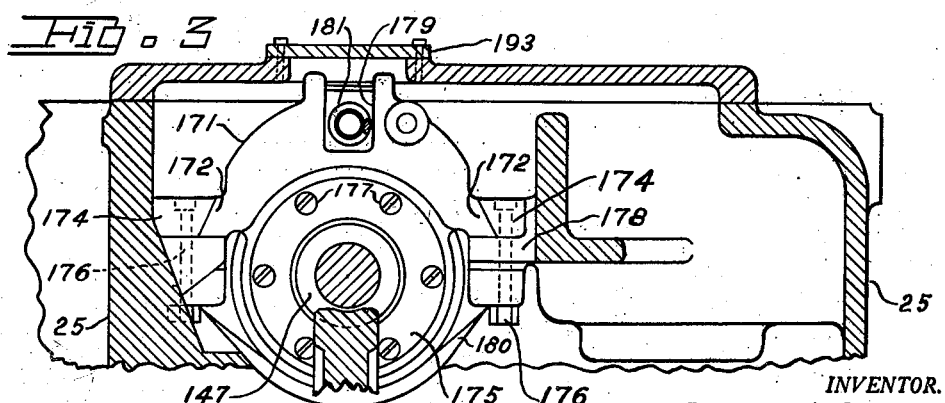
Fig. 3 is a cross-sectional view taken on line 3—3 in Fig. 2 and partially broken away, showing the worm shifting slide.

As shown in Fig. 3, the sliding bearing bracket 171 is provided on opposite sides with two laterally projecting flanges 172 which have bevelled outer slide surfaces for receiving gibs 174 which are clamped by bolts 176 on stationary vertically disposed slides 178, whereon the bearing bracket slides to oscillate the worm axially. In Fig. 3 may also be seen a fixed bracket 180, which comprises a ring support at its intermediate portion, as shown in Fig. 2, for supporting the outer race ring of a ball bearing 182. The inner race ring of the ball bearing 182 is secured to and carries the bevel gear 129. Retainer rings 184 clamp the inner and outer race rings of the ball bearing 182 to the bevel gear 129 and to the bracket 180. The lower end of the worm shaft 131 is provided with keys 186 to provide for positive driving connection with the bevel gear 129 while permitting the shaft to slide freely therethrough as the worm is oscillated axially, while rotating at constant speed.

As shown in Fig. 2, the worm oscillating member is a lever 199 and the end thereof remote from the slide bracket 171 is provided with a bearing which is pivotally journalled upon a pivot shaft 201 which extends between a pair of spaced bearing lugs 203 projecting into the headstock housing through an opening therein from a bearing plate 205 which is secured firmly upon the outside of the wall of the housing, as by screws 207. Rotatively journalled in the headstock housing, under an intermediate portion of the worm oscillating lever 199, is a shaft 209 carrying a cam 211 which engages a hardened slide block 213 and actuates the lever. In accordance with my invention, the cam utilized in such a combination may be of a special shape to provide for smooth, vibration free, operation, as will be subsequently described in detail. Fig. 4, shows that from the cam shaft 209, a hollow extension shaft 213 extends secured by the same key 210 which secures the cam. The hollow extension shaft 213 passes through and is journalled in an intermediate bearing 214 and the remote end projects through and is journalled in a suitable bearing 215 in the inside end wall of the headstock housing. The projected end of the extension shaft is provided with a laterally projecting annular flange 216 having circular face slots 217 wherein T-bolts 218 are socketed for adjustably securing a spline disc 219 thereto. The spline disc 219 is provided with a central aperture which is splined for receiving the splined end of a shaft 221 in a free positive driving arrangement for sliding freely into the hollow extension shaft 213. From the headstock 25, the shaft 221 extends and passes into the saddle box 223 under the tool rest 18, shown in Fig. 6, for actuating a relieving tool 145. The relieving tool 145 is by this arrangement retracted in timed relation to the rotation of the toothed cutter 143 being relieved and also in timed relation to the pause which is periodically introduced into the rotation of the toothed cutter or work piece by the axial movement of the worm 147.

Figure 6:
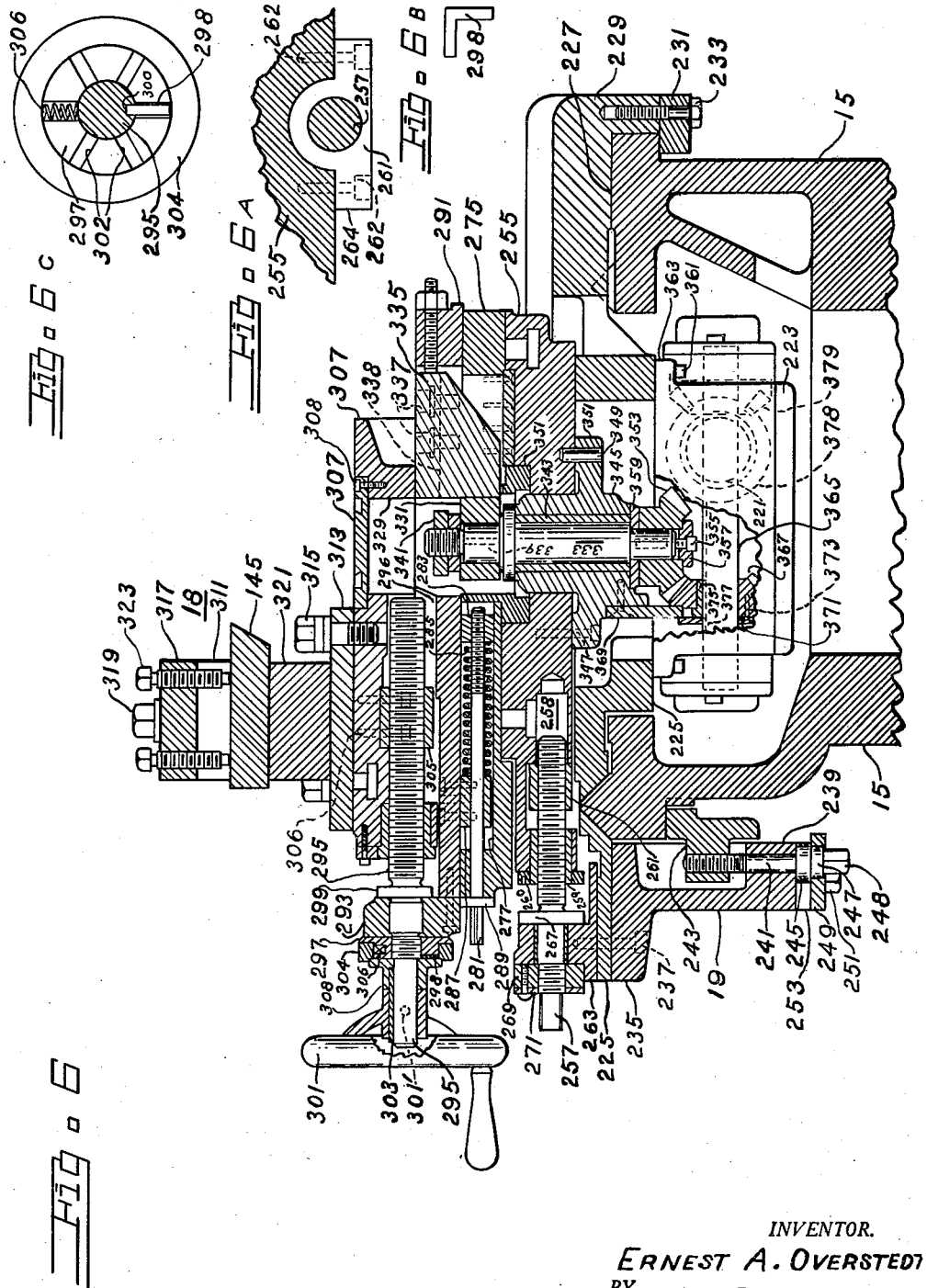
Fig. 6 is an enlarged cross-sectional view of the tool rest on line 6—6 in Fig. 1, and partially broken away, showing the tool rest driving mechanism for reciprocating the tool radially of the work.

As Fig. 6 shows, the tool rest 18 comprises a saddle 225 of a suitable shape to rest slidably on top of the back and front edges of the machine bed, an inverted V-way being provided at the front. At the rear, the saddle extends back over a flat upturned guide surface 227 on top of the rear wall of the machine bed and is provided with a down turned flange 229 sliding snugly along the back edge of the stationary guide surface. A gib 231 slides snugly under the under side of the downwardly extending guide flange 229 and is secured to the under side of the back flange of the saddle by cap screws 233. The apron 19 has a laterally extending flange 235 secured under the forwardly projecting end of the saddle by cap screws 237 so that the apron is supported depending in spaced relation from the front of the machine. The lower edge of the apron 19 has a thick inwardly projecting flange 239 and the threaded end of a gib adjusting screw 241 is passed upwardly through a vertical aperture therein, for supporting on its upper end a gib 243 engaging guide surfaces on the under side of the front V-guide. The gib adjusting screw 241 is provided with an annular flange 245 of larger diameter near its headed end and a cylindrical portion 247 of smaller diameter between the flange and the wrench receiving head 248. A retainer plate 249 is provided having an aperture suitable to rotatively journal the cylindrical portion 247 of the screw with the larger flange 245 resting on the upper side and the head projecting below. The retainer plate 249 is secured spaced under the bottom edge of the bottom flange 239 of the apron as by a screw 251 and spacer means 253 which may be a projection integral with the apron.

A lower cross slide 255 rests slidably upon the saddle 225, these two members being provided with suitable engageable sliding surfaces, in accordance with the usual practice in providing cross-slides for lathes and similar metal turning machines. The position of the lower cross-slide 255 may be adjusted upon the machine by a lead screw 257 having a threaded end passing freely into an aperture 258 opening from the front end of this slide member. The screw 257 passes through a wear adjusting nut, or slack motion eliminating nut 259, which is also provided with a fine external thread which screws into a corresponding thread provided in an aperture which opens in from the front of the slide 255. A lock nut 260 is also threadably disposed on the outer thread on the outer end of the nut 259 for securing it in any adjusted position. The threaded portion of the screw 257 also passes through a threaded nut 261 which is disposed in an enlarged recess in the aperture 258 in the slide 255 where it is secured to the under side of the slide by screws 262 passing up through lateral lugs 264 as shown in Fig. 6A, an enlarged detail view. The screw 257 is secured stationarily to the saddle by a cutter slide bracket 263 attached to the saddle as by the screw 237 (shown dotted). The lead screw 257 is provided with a flange 267 which engages the rear side of the bracket 263 and a collar 269 is threadably secured on the front end of the lead screw for snugly engaging the front side of the bracket. The collar 269 is firmly secured upon the screw 257 in any suitable manner, as by a lock washer 271. A bushing may be provided in the bracket 263 for journalling the lead screw. The front end of the lead screw 257 projecting toward the front of the machine is made square, or any suitable non-circular shape, for receiving a wrench or any suitable tool for conveniently turning the lead screw to adjust the lower cross-slide 255 forwardly or backwardly to any desirable position.

Resting slidably upon the lower cross-slide is a tool slide swivel plate 275, suitable smooth sliding and guiding surfaces being provided therebetween in a well known manner. The slide 275 is provided with a large horizontal recess 277 which opens upwardly and rearwardly and from whence an aperture extends opening through the front end for receiving a spring tension screw 281 rotatively therein. The inserted end of the spring tension screw 281 disposed in the large recess 277 is threaded for adjusting the position of a block or nut 283 thereon to compress a compression spring 285 disposed concentrically upon the screw. The other end of the spring 285 reacts against an apertured block 287, through which the screw passes freely. An angular flange 289 near the front end of the spring adjusting screw engages the front end of the tool slide swivel plate 275 and the projecting end of the screw is made square in cross section for conveniently receiving a suitable wrench for turning the screw to draw the block nut 283 forward or to release it backward to compress or release the spring.

Slidably disposed upon the toolslide swivel plate is a tool slide guide 291, smooth guiding and slidable surfaces being provided therebetween in accordance with the usual practice. The previously mentioned spring pressed block 287 is secured to the bottom of the tool slide guide 291 as by cap screws, shown dotted, and the reaction of spring 281 thereon tends to urge the tool slide to move forward at all times. Attached on the front end of the tool slide guide 291, as by screws (shown dotted) is an apertured bracket 293 in which a lead screw 295 is rotatively journalled with the threaded portion extending back horizontally over the top of the tool slide guide which has an elongated recess 296 therein. The front end of the lead screw is also threaded for receiving a nut 297 whereby an annular flange 299 spaced therefrom on the screw is clamped snugly against the bracket 293 to hold the lead screw in the tool slide guide. To secure the nut 297 firmly, after it has been screwed onto the end of the shaft, an L-shaped key 298, Fig. 6B, has one arm inserted into a keyway 300 in the side of lead screw, Fig. 6C, while the other arm of the key is disposed in the nearest radial keyway 302, a plurality of which are provided in the face of the nut. A graduated ring 304 is then disposed in an annular groove from the front side of the nut to hold the key, and a coil spring 306 secures the ring thereon. The front end of the screw 295 projects substantially forward through the bracket 293 to receive a flanged sleeve 308 and a hand wheel 301 secured thereon by a set screw 301 and a key 303. Threadably received on and actuated by the lead screw 295 is a nut 305 which is secured by screws 306 (shown dotted) to the under side of a top slide 307 which may thereby be adjusted to any desired position forward or backward on the tool slide guide.

Mounted upon the tool slide 307 is the tool holder 18 which may comprise a tool box 311 of a substantially rectangular conformation having a pedestal 313 secured on the slide by screws 315. The tool box 311 may be formed with the bottom and the two side legs integral, as a U shaped member in an inverted position with a top member 317 extending across and secured on the upper ends of the side legs, as by screws 319. A suitable relieving tool 145, to be used for relieving the teeth of a toothed rotary cutter, is disposed horizontally in the frame and extending therethrough with the metal cutting point projecting to the rear, as shown. The tool is held firmly down on a block 321 on the bottom member of the holder by a pair of screws 323 passing down through the top member. The tool is also held firmly, and adjustable laterally, by shim blocks 325 (Fig. 1) between the ends of bolts 327 passing horizontally through the side members of the frame.

To move the tool holder and tool 145 backwardly toward the work for feeding the tool point radially against the back surface of a tooth of the cutter to be relieved, vertical central apertures 329 are provided substantially aligned vertically through the saddle 225 and all the slide and guide members mounted thereon for receiving a cam 331 mounted on the upper end of a shaft 333. The cam 331 is suitably disposed for engaging a cam follower 335 which is disposed in the aperture 329 and secured to the tool slide guide 291 as by screws 337 (dotted) passing down into the upper side thereof through a lateral flange 338 from the cam follower. The cam 331 is secured to the shaft, as by a key 339 and retained in place by nuts 341 applied upon the upper end of the shaft. The cam spindle 333 is journalled vertically in a bushing 343 in a cam spindle bracket 345 which is firmly secured by screws 347 (dotted) and pilot pins 349 passing through lateral lugs 351 from the bracket and engaging the under side of the lower cross-slide 255. The upper end of the central aperture through the lower cross-slide 255 is provided with an annular groove of larger diameter wherein is seated the lower end of a centering ring 351. The upper end of the centering ring 351 is of a reduced diameter extending up into the vertical central aperture in the adjacent member thereabove. Cover 307' is secured by screw 308.

The cam shaft 333 is driven from the lower end. For this purpose, the lower end of the cam shaft is preferably of reduced diameter and is provided with a miter gear 353 secured thereon, as by a cap screw 355 with socket head which enters the lower end of the shaft and draws a washer 357 up into the center of the gear. A spacer ring 359 is disposed between the cam shaft gear 353 and the lower end of the bracket 345. The cam shaft miter gear 353 is so mounted that it projects down into an open top gear box 223 which is secured to the under side of the saddle, as by screws 361 passing up through flanges 363 extending laterally around the upper edges of the gear box. A short shaft 365 is mounted horizontally in the gear box with the ends thereof journalled in suitable bearings in the front and rear ends of the box. Slidably mounted on the shaft 365 is a miter gear 367 which is maintained in mesh with the gear 353 on the cam shaft by a fork 369 secured on the lower end of the cam shaft bracket 345 in any suitable manner as by screws (dotted), and which projects down between the back of the sliding miter gear 367 and a flange disc 371, secured thereon, as by screws 373. The slidable gear 367 is operatively connected to the short shaft 365 at all times through a sliding key 375 connecting between the gear and a slot 377 extending axially in the shaft. The spline shaft 221 from the headstock enters the saddle gear box 223 through the side wall adjacent the headstock, and is therein journalled in any usual manner. The end of the spline shaft 221 in the gear box has a suitable miter gear 378 (shown dotted) which is secured thereon for meshing with a (dotted) miter gear 379 which is secured on the rear end of the short shaft 365 in the gear box, which is thereby driven at all times when the spline shaft 221 and worm cam 211 in the headstock are rotating. As the tool slide is adjusted to various positions forwardly or backwardly, the miter gear 367 slides back and forth on the short shaft 365 in the gear box, and driving connection with the tool reciprocating cam 331 in the tool rest is maintained in all positions.

Fig. 7 diagrammatically represents the layout of the improved operating arrangement of my relieving machine, utilizing two cams for shifting the work driving worm axially to introduce a pause in the rotation of the toothed cutter being relieved while retracting the tool for relieving the next approaching tooth on the cutter. This doubles the time available for tool retraction and substantially reduces vibration and shock in the operation of the relieving machine. The advantages of this arrangement are still more effectively realized by providing a tool feeding and retracting cam 331 of a particular conformation such that the tool in-feeding portion is of substantially five-sixths, or more, of a cam phase for advancing the tool support toward the work support, as shown in Fig. 8. The receding or retracting portion of the cam is of one-sixth cam phase, or less, for controlling the retraction of the tool support upon completion of a relieving cut and preparatory to starting a relieving cut on the back of the next advancing tooth of the cutter.

In a machine which was found to be very satisfactory in operation, a cam of this shape was utilized, having one lobe and a throw of three-sixteenths of an inch, as represented in Fig. 8. It will be understood that this cam shape may also be embodied in cams having two or more lobes to be rotated at speeds proportionately slower. Also the throw of such a shaped cam may be variously selected to suit the varying requirements of such a machine, and a set of such cams may be provided to be interchangeably installed. The cam for reciprocating the work spindle driving worm is preferably of a similar shape.

In operation, if it is desired to relieve the teeth of a multi-toothed cutter, such as represented in dotted outline in Fig. 2, it is usually mounted upon an arbor (not shown). The cutter, or work piece, is centered accurately upon the arbor. One end of the arbor is clamped in the end of the work rotating spindle. For convenience in so mounting a work supporting arbor, a tapered collet 391 may be mounted in a tapered nose 393 in the end 27 of the spindle shaft 133, which is hollow. The nose 393 is secured by studs 394 passing through curved slots 394' in the flange 27 of the spindle. A collet rod 395 threadedly enters the inner end of the collet 391 from which it extends, passing through the hollow shaft and projecting from the other end where a hand wheel 397 is secured firmly upon the rod for turning the rod and pulling the collet to clamp the arbor therein. The other end of the work supporting arbor may then be supported on the tail stock 11. However, some kinds of work are supported entirely in the headstock by means of any suitable chuck as will be readily understood.

The operator mounts a suitable relieving tool in the tool holder. Also he selects suitable change speed gears 41 and a suitable cam 331 to suit the number of teeth on the cutter and the amount of relief which may be required in that particular case.

The angular rotative position of the work piece, or cutter, and the tool operating cam are carefully adjusted so that the point of the relieving tool moves in toward the work in a properly timed relation to engage the back surfaces of a cutter tooth just after the cutter edge has passed. This may be accomplished either by releasing the collet adjusting the work in the spindle nose or the bolts 218 in the slots 217 in the connections of the splined tool driving shaft may be adjusted. Starting the motor the operator manipulates speed control 35 to drive the machine at a suitable speed.

As the work piece or cutter 143 rotates, the tool shifting cam 331 advances the relieving tool 145 which makes a relieving cut on the tooth of the cutter. Simultaneously the cam 211 is rotated for controlling the axial position of the constantly rotating worm 147. As the next advancing tooth of the cutter approaches the relieving tool, the receding surface of the cam 211 releases the pressure on the oscillating lever 199 which falls back and moves the worm shaft 131 axially. This introduces a pause or a hesitation in the rotation of the work piece or cutter. As previously described, the receding surface of the cam extending around about ⅛ of a cam phase advantageously moves the worm axially and provides about twice as much time, as would otherwise be available, for retracting the tool to start a relieving cut on the next approaching tooth. In this combination my improved tool feeding and retracting cam is advantageously utilized to greatly reduce vibration and shock.

Also the tool slide swivel plate 275 may be swung around to any angular position up to at least 180 degrees. This provides for the reciprocating tool movement to be toward or away from the headstock for relieving teeth on left hand cutters, face mills and the like. When such an adjustment is made, the tool operating cam 331 should also be shifted through a corresponding angle by releasing the T-bolts 218 and adjusting the spline coupler.

By turning the hand wheel 21, Fig. 1, the rack teeth 23 are engaged for moving the saddle and tool rest assembly longitudinally along the machine bed to adjust the position of the relieving tool suitably for various kinds of work or for adjusting the relation of the tool to a particular piece of work.

In my improved relieving machine, the lower cross-slide 255 and its lead screw 257 render it possible to make adjustments of a predetermined amount toward or away from the axis of the work by turning the screw a predetermined amount, even when the tool slide swivel plate is turned for reciprocating the tool at an angle. This substantially facilitates predetermined adjustment by the operator who does not have to disturb a previous setting to make a different adjustment. In operation, my improved arrangements for coordinating the reciprocative retracting movements of the tool and the rotative movements of the toothed cutter being relieved have the advantage of reducing shock and vibration in the machine and providing smoother operation than has been usual in previously known mechanisms of this class.

It is to be understood that within the scope of my invention modifications and different arrangements may be made other than herein disclosed, and the present disclosure is illustrative merely, the invention comprehending variations thereof.

I claim:

1. A metal turning machine having variable work rotation means comprising, a rotary work supporting spindle, a worm wheel for rotating said spindle, a worm for rotating said worm wheel, means journalling said worm for simultaneous rotation and axial shifting, a lever, stationary pivot means for anchoring one end of said lever, the other end of said lever being disposed for operative engagement with the axially shiftable worm, a cam, means supporting and rotating said cam in a position engaging the side of the lever remote from the worm for pushing the lever to move the worm axially in a pre-determined direction, and spring means biasing the movable structure to continuously engage the lever against the cam and to move the worm axially in a reverse direction when the receding surface of the cam releases the lever.

2. A metal turning machine having variable work rotation means comprising, a rotary work supporting spindle, a worm wheel for rotating said spindle, a worm for rotating said worm wheel, a shaft supporting said worm in meshing relation with said worm wheel, a bearing rotatively supporting one end of said shaft, stationary support means slidably supporting said bearing, a second bearing for rotatively supporting the other end of said shaft, movable bearing support means supporting said second bearing, guide means restraining the movable bearing support means to move in directions parallel to the axis of said shaft, a lever, stationary bearing means pivotally anchoring one end of said lever with the other movable end of the lever disposed for engaging said movable bearing support means to move it parallel to the axis of the shaft, a cam, and a shaft rotatively supporting said cam in a position for engaging said lever to oscillate the lever and move the movable bearing support means, the shaft and the worm substantially parallel to the axis of said shaft.

3. A metal turning machine in accordance with claim 2, and further characterized by having a resilient biasing means continuously urging the movable bearing support into engagement with the oscillating lever.

ERNEST A. OVERSTEDT.